(12) United States Patent
Ekström et al.

(10) Patent No.: US 7,490,163 B2
(45) Date of Patent: Feb. 10, 2009

(54) DATA UNIT TRANSMISSION METHOD AND DEVICE

(75) Inventors: Hannes Ekström, Stockholm (SE); Henning Wiemann, Aachen (DE); Joachim Sachs, Aachen (DE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 345 days.

(21) Appl. No.: 10/550,112

(22) PCT Filed: Mar. 20, 2003

(86) PCT No.: PCT/EP03/02927

§ 371 (c)(1),
(2), (4) Date: Sep. 19, 2005

(87) PCT Pub. No.: WO2004/084517

PCT Pub. Date: Sep. 30, 2004

(65) Prior Publication Data

US 2006/0224770 A1   Oct. 5, 2006

(51) Int. Cl.
*G06F 15/16* (2006.01)
*G06F 15/173* (2006.01)

(52) U.S. Cl. ........................ 709/238; 709/236

(58) Field of Classification Search ........... 709/228, 709/230, 236, 238; 370/352, 356, 471
See application file for complete search history.

(56) References Cited

U.S. PATENT DOCUMENTS 6,256,314 B1 *  7/2001  Rodrig et al. ............. 370/401

(Continued)

FOREIGN PATENT DOCUMENTS

WO    WO 02 03650 A    1/2002

(Continued)

OTHER PUBLICATIONS

The Internet Society Network Working Group. RFC 2460 Internet Protocol, version 6 (IPv6) Specification (http://tools.ietf.org/html/rfc2460 ). Dec. 1998. Sections 4.4, 6, and Appendix A.*

(Continued)

*Primary Examiner*—Salad Abdullahi
*Assistant Examiner*—Imad Hussain

(57) ABSTRACT

A method of controlling a transmission of data units arranged in accordance with a predetermined communication protocol over a plurality of network entities, said network entities operating according to said predetermined communication protocol, from a sending network entity to a receiving network entity over one or more forwarding network entities, comprising providing in a data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not, and in said one or more forwarding network entities, performing a data unit processing operation after receiving said data unit, which comprises reading said first data field and making an identification decision on the basis thereof whether the forwarding network entity performing said data unit processing operation is identified or not.

33 Claims, 7 Drawing Sheets

U.S. PATENT DOCUMENTS

| | | | |
|---|---|---|---|
| 6,278,714 B1 * | 8/2001 | Gupta | 370/422 |
| 6,286,052 B1 * | 9/2001 | McCloghrie et al. | 709/238 |
| 6,292,495 B1 * | 9/2001 | Von Hammerstein et al. | 370/465 |
| 6,434,624 B1 * | 8/2002 | Gai et al. | 709/232 |
| 6,970,913 B1 * | 11/2005 | Albert et al. | 709/217 |
| 2002/0010792 A1 * | 1/2002 | Border et al. | 709/238 |
| 2003/0009584 A1 | 1/2003 | Vaidhyanathan et al. | |
| 2003/0028822 A1 | 2/2003 | Williams et al. | |
| 2004/0114569 A1 * | 6/2004 | Naden et al. | 370/351 |
| 2005/0232285 A1 * | 10/2005 | Terrell et al. | 370/401 |

FOREIGN PATENT DOCUMENTS

| | | |
|---|---|---|
| WO | WO 02 100064 A | 12/2002 |

OTHER PUBLICATIONS

Raz, Danny et al. An Active Network Approach to Efficient Network Management. 1999. Bell Laboratories. pp. 1-19.*

Tennenhouse, David L. et al. Towards an Active Network Architecture. 2002. IEEE. pp. 1-14.*

Keller, Ralph et al. PromethOS: A Dynamically Extensible Router Architecture Supporting Explicit Routing. 2002. SFIT. pp. 1-12.*

* cited by examiner

DATA UNIT TRANSMISSION METHOD AND DEVICE

FIELD OF THE INVENTION

The present invention relates to method of controlling a transmission of data units arranged in accordance with a predetermined communication protocol from a sending network entity over at least one forwarding network entity to a receiving network entity, and also relates to the corresponding network entities and methods of controlling these network entities.

BACKGROUND OF THE INVENTION

In the field of data communications, it is known to transmit data from a sender to a receiver in the form of data units, where each data unit contains some form of appropriate information that lets forwarding network entities guide or route the data unit to its intended destination, i.e. the receiver. This will briefly be explained with reference to FIG. 1. FIG. 1 shows a communications network 2 and communication devices 10-14, which are capable of accessing network 2. Network 2 is shown as comprising a plurality of forwarding entities 21-25. It is noted that the representation in FIG. 1 is only schematic and that real networks generally comprise a far larger amount of forwarding entities and accessing entities. It is noted that within the context of the present specification and claims, any functional element capable of interacting with or interacting in a communication network will be referred to as a network entity. Moreover, it may be noted that the term entity refers to any element capable of providing a certain function (such functions e.g. being sending and/or forwarding and/or receiving), where an entity can be provided by hardware, software or any suitable combination of hardware and software, and an entity can be provided by one physical unit (such as a computer, server, telephone terminal, etc.) or can be spread over several physical units.

In the schematic example of FIG. 1, if e.g. network entity 10 sends data to network entity 11, it will divide the data to be sent into segments, place the segments into data units, where each data unit has a structure defined by the communication protocol governing the communication over network 2. A communication protocol is a set of rules for arranging data and for handling data in entities operating in accordance with the protocol. Examples of such communication protocols are TCP (Transmission Control Protocol), XCP (eXplicit Control Protocol) or various versions of ATM (Asynchronous Transmission Mode) protocols.

FIG. 3 shows a schematic example of a data unit 21. In this example, the data unit has a beginning identifier 31, an ending identifier 32, a header 33 and a payload section 34. The data segment to be sent to the receiver is placed in the payload section 34, whereas information related to the forwarding and handling of data unit 21 is set in the header 33 in accordance with the rules laid out by the protocol governing the transmission. For example, the protocol can prescribe that a specific field 331 is a forwarding data field containing information that is used by forwarding network entities for forwarding the data unit 21 to the designated receiving network entity. Such information can e.g. be an address within an addressing scheme provided by the protocol. It is noted that the term field within the present specification and claims relates to any identifiable section of a data unit, where such a section may consist of a contiguous number of data symbols (e.g. bits), or can be spread out over the data unit. Furthermore, it is noted that various protocols use different names for their basic data units, such as protocol data unit, frame, packet, etc., and that the term data unit is used generically in the present specification and claims to relate to any such subdivision of data being sent in accordance with a given protocol.

Consequently, if sending network entity 10 would like to transmit data to receiving network entity 11, it divides the data into segments and places these segments into data units 21, in which appropriate information leading towards network entity 11 is set in field 331. These data units 21 are then passed into the network, e.g. forwarding network entity 21 as shown in FIG. 1. Forwarding network entity 21 then handles and forwards the data units in accordance with the rules given by the underlying protocol, such that these data units pass to receiving network entity 11 via further forwarding entities 22, 23, 24 or 25, 24. This concept is well known in the art and therefore does not need to be described in further detail here.

PROBLEM UNDERLYING THE INVENTION

As can be seen in the schematic example of FIG. 1, a data unit oriented communication system will generally contain a large number of forwarding network entities (such as the entities 21-25 shown in FIG. 1), where each of these forwarding entities handles data units arriving from a number of other network entities, such as the shown accessing entities 10-14, but possibly also from other forwarding network entities within the network. A set of data units that have a sending network entity and a receiving network entity in common are sometimes also referred to as a flow. Therefore, expressed in other words, each forwarding network entity in network 2 will typically simultaneously handle a plurality of flows. It is easily understandable that this provides for complicated control situations within each individual network and within the network as a whole.

OBJECT OF THE INVENTION

The object of the invention is to provide a mechanism for improving the control possibilities and options in networks and communications of the above-described type.

SUMMARY OF THE INVENTION

This object is solved by the subject-matter of the independent claims. Advantageous embodiments are described in the dependent claims.

In accordance with the present invention a first data field is provided in a data unit being transmitted, which field is arranged to contain network entity identification information, in order to identify a network entity involved in the communication from the sending network entity to the receiving network entity. This includes the possible identification of the sending entity or the receiving entity. Furthermore, this specific data field is different from the above mentioned forwarding data field designated by the underlying communication protocol to contain information to be used by forwarding network entities for forwarding the data unit to the receiving network entity. The additional data field of the invention is defined in such a way that a given network entity that reads this data field can at least make a decision on the basis thereof whether this given network entity is identified or not.

Consequently, an important concept of the present invention consists in providing an identification mechanism in each data unit, such that within a given end-to-end communication or flow, an addressing of network entities involved in this communication can be performed. An important advantage is that the plurality of network entities involved in the communication do not have to store any flow related information on the potentially very large number of flows passing through, as they only need to embody a mechanism for identifying themselves, i.e. determining whether a given data unit identifies the network entity that is processing that data unit, or not. Consequently, the increase in complexity is very low, but due to the identification mechanism a new degree of freedom is gained for performing control operations within a data unit oriented communication system.

For example, it is possible to convey specific information to a given network entity that is involved in a end-to-end communication between a sending network entity and receiving network entity.

According to a preferred embodiment of the present invention, the above described general concept is applied in the context of a distributed congestion control mechanism, in which multiple network entities can give congestion control information to the communicating end-points.

BRIEF DESCRIPTION OF FIGURES

In the following, the concepts and advantages of the present invention will be described by referring to preferred embodiments, which are described in conjunction with the appended figures, in which.

DETAILED DESCRIPTION OF EMBODIMENTS

Although the following description of preferred embodiments of the invention will sometimes make reference to specific communication protocols, it is noted that the present invention can be applied to any communication protocol that falls into the general context of one of the independent claims. In other words, the present invention is not restricted to any specific protocol or protocols.

Figure 1:
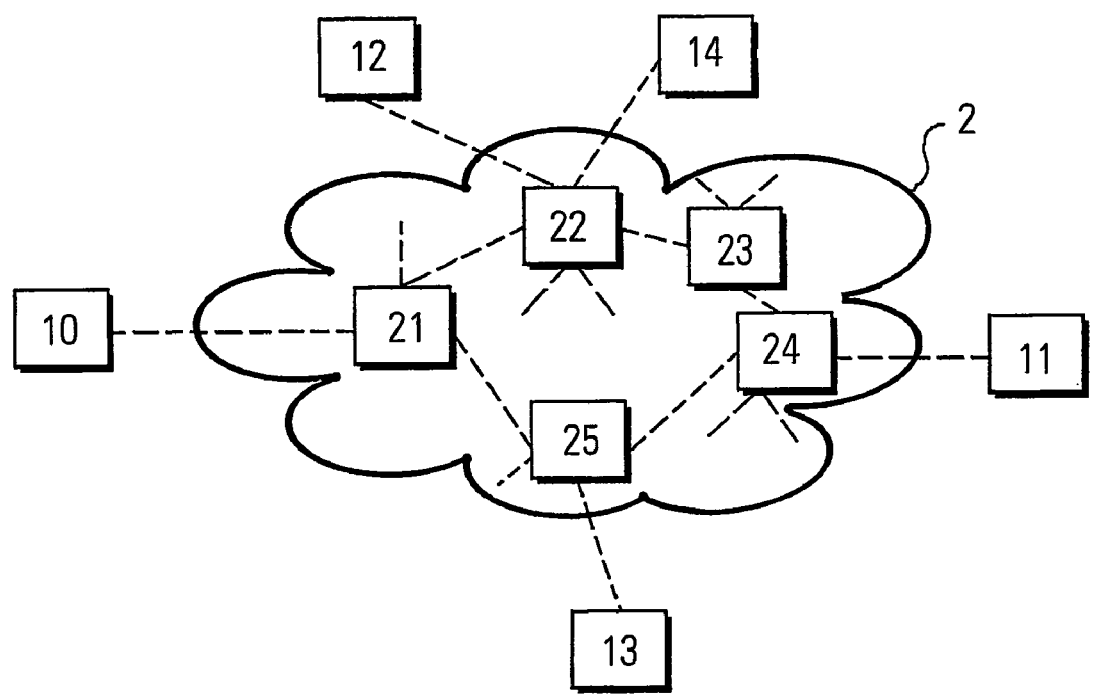
FIG. 1 is a schematic representation of a communication network and associated network entities.
Figure 3:
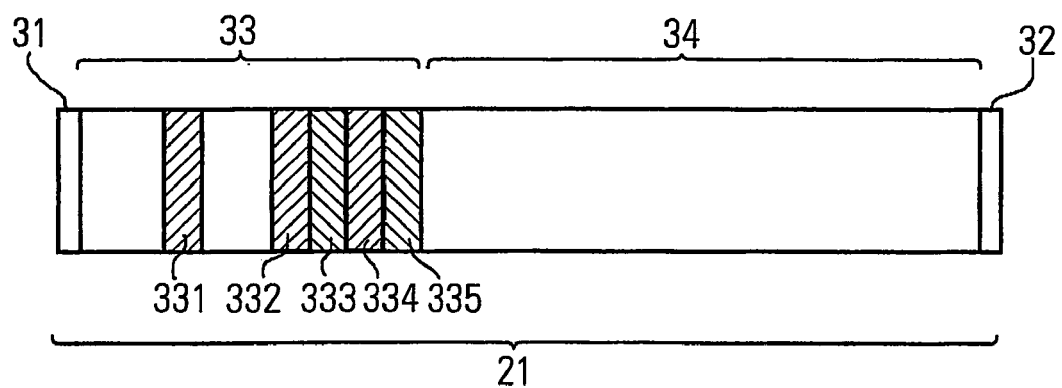
FIG. 3 is a schematic representation of a data unit.

The present invention can be applied to a communication system as previously described in FIG. 1 and to data units 21 as previously described with respect to FIG. 3. Namely, in accordance with the invention, a specific data field is added to a data unit being transmitted. As already described previously with respect to FIG. 3, the data unit 21 has a forwarding data field 331 designated by the communication protocol to contain information to be used by forwarding network entities for forwarding the data unit to the intended receiving network entity. In accordance with the invention, a new data field is provided in the data unit, said new data field being referred to as 332 in FIG. 3. The new field 332 is arranged to contain network entity identification information. The new field 332 and the information to be contained therein is defined in such a way that a given network entity that reads the field 332 can at least make a decision on the basis thereof whether the given network entity is identified or not. In accordance with a method of controlling the overall transmission from the sending network entity to the receiving entity, the one or more forwarding network entities involved in the transmission perform a data unit processing operation after receiving a given data unit, which comprises reading the new data field 332 and making an identification decision on the basis thereof, whether the forwarding network entity presently handling the received data unit is identified therein or not.

There are various possibilities for specifically using the above-described general concept. For example, the provision of the new network entity identification field 332 can be used to convey information to a given forwarding network entity. In other words, e.g. the sending network entity is thereby made capable of communicating with individual selected forwarding network entities that are involved in forwarding data units between the sending and the receiving network entity. This can be used to convey specific information to a forwarding network entity thus defined, in which case the data unit processing operation in the forwarding network entities comprises reading included information in the data unit, if the identification decision determines that the forwarding network entity performing the data unit processing operation is identified in the new field 332.

According to another aspect of the invention it is possible to define that the network entity defined in the new field 332 is associated with the fulfillment of a predetermined condition with respect to the other network entities involved in the transmission from the sending network to the receiving network entity. In other words, the control procedure in the forwarding network entities and the receiving network entities can use the identification information contained in the new field 332 for internal control purposes, as the system is arranged in such a way that the network entity identified in the new field plays a specific role within the context of the overall communication from the sending to the receiving network entity. For example, the network entity identified in the new field can be associated with providing the smallest amount of transmission capacity to the transmission between the sending network entity and the receiving entity among all network entities involved in the transmission, i.e. the new field 332 can be defined to identify the bottleneck of the transmission.

Preferably, if the network entity identified in the new field is associated with a specific condition, the data unit processing operation in the forwarding network entities furthermore comprises a decision procedure for deciding whether to change the contents of the new field, and a changing procedure for changing the contents of the new field in dependence on the outcome of the decision procedure. The decision procedure can be linked to testing the specific condition in the presently acting forwarding network entity. For example, each forwarding network entity that receives a data unit can determine whether it fulfils the condition associated with the network entity identified in the new field 332, and then enter its own identification if the condition is fulfilled, to thereby notify the subsequent network entities of this fact.

The addition of the new data field 332 to data units can be accomplished in any suitable or desired way. For example, it is possible to modify given communication protocols by additionally defining a field of the above-described type at an appropriate location in data units of said modified communication protocol. However, it may be noted that it is not necessary to redefine protocols in order to implement the concept of the present invention, because it is equally possible to adapt network entities using the present application to make use of such portions of a data unit that are left unassigned by the underlying communication protocol. If the latter implementation is chosen, then only such network entities adapted to the invention will look into the proper portion of a data unit, whereas compatibility to non-adapted network entities is retained, because these do not use the newly defined field. However, it is preferable to indeed adapt a given communication protocol to define the new data field 332 as indicated above, such that all network entities operating in accordance with the protocol can use the concepts of the present invention. In this way, the present invention can be embodied in the form of a communication protocol, where the rules of the protocol provide for the new network entity identification field 332 as described above. Equally, the present invention can be embodied in the form of a data unit carrying such a new network entity identification data field 332.

The locating of the new data field 332 within a data unit can be accomplished in any suitable or desirable way, e.g. as known for fields already in use. For example, a given position in the data unit can be identified by using the first data symbol (e.g. bit or byte) following the start mark 31 as the origin, and then defining the field with two coordinates counted from said point of origin, said two coordinates defining the beginning and end of the field. Namely, the field 332 can e.g. be defined as all data symbols found between the locations n and n+k, n and k being positive integers that describe the umber of symbols counted from the point of origin. However it should be noted that this is only an example, and it is e.g. also possible to spread the contents of the field 332 over the data unit in a non-contiguous manner.

Preferably, the new data field 332 is not only able to identify a given network entity, but much rather defined such that a given network entity that reads the network entity identification information from the field can make a decision on the basis thereof whether no network entity at all is identified by said new data field 332. This feature can be provided in any desirable or suitable way, e.g. by defining that all values falling within a certain category (e.g. all negative values) are to be associated with the information that no network entity is identified. Preferably, the information that no network entity at all is identified is associated with a predetermined default value for the new data field 332, e.g. a predetermined symbol sequence, such as −1.

The specific way of defining the information structure in the new data field 332 can be done in any suitable or desirable way. For example, it is possible to let the network entity identification information in the new field 332 comprise a unique identifier, where each network entity involved in the communication has assigned its own identifier, such that the identification decision comprises comparing the unique identifier contained in the new data field 332 with the unique identifier assigned to the forwarding network entity performing the data unit processing operation.

Another way of arranging the information in the network entity identification field 332 is if the data units being sent comprise some form of count value, where this count value is set to a predetermined initial value in the sending network entity and where each forwarding network entity changes (e.g. increments or decrements) the count value by a predetermined count difference value (e.g. 1) after receiving a data unit. The changed count value is then set into the data unit before forwarding it. An example of such a count value is the so-called time-to-live (TTL) parameter known from IP (Internet Protocol). The TTL parameter is chosen to an initial value of 64 and decremented each time that the data unit is forwarded. If the TTL value reaches zero, the data unit is dropped. The purpose of the TTL value is to avoid excessive forwarding within the network, especially in the context of a back and forth reflection between two entities.

If a count value of the above-mentioned type is employed for the data units being forwarded, then the network entity identification information in the new data field 332 may be selected to have the same format as the count value, namely in the form of a count compare value. The identification decision then comprises comparing the count compare value from the field 332 with the count value read from the received data unit and/or with the changed count value set in the data unit before forwarding.

Using the down-counter like TTL as example, the identification concept can e.g. be used in the following way. The sending network entity sets a predetermined initial value, e.g. 64 in an appropriate location within a data unit being sent, e.g. the field 333 shown in FIG. 3. Furthermore, if the sending network entity wishes to identify a network entity in the network entity identification field 332, it sets a number in the range of 0-64 in this field, e.g. 62. If the forwarding network entities are then arranged to compare the decremented value of counter field 333 with the value in field 332, then the value 62 identifies the second forwarding network entity along the path from the sending network entity to the receiving network entity.

Although the above example used a counter that is decremented, it is equally well possible to use a counter that is incremented. In this case the initial value could e.g. be 0, and a value of n (n being a positive integer) in the network entity identification field 332 then identifies the n-th network entity along the path from the sending network entity to the receiving network entity.

It is noted that one of the advantages of using the counter based identification system is that the network entities themselves do not need to store any information on their own identification. Namely, the identification is a relative form of identification, which is derived from each individual data unit.

In connection with the concept of relative identification, it is noted that it is furthermore possible to implement the data unit processing operation in the forwarding network entities (and in the receiving network entity) in such a way, that a procedure is provided for further distinguishing whether a received data unit has passed the network entity identified in the network entity identification field 332 or not. In the context of using a counter value of the basis for identification, this can be done by comparing whether the count compare value in that identification field 332 is larger or smaller than the count value in the counter field 333.

However, the concept of determining whether a received data unit has passed the network entity identified in the network entity identification field 332 or not, can also be implemented within the context of any arbitrary identification scheme. Namely, it is in any case possible to add to the data units a further date field, e.g. identified as 334 in FIG. 3, which provides information on whether the network entity identified in field 332 has been passed or not. This field 334 is independent of the field 332, and can e.g. consist of a single bit, where one bit value indicates that the identified network entity has been passed and the complementary value indicates that the identified network entity has not been passed. It is noted that the use of the additional field 334 for identifying whether the entity in field 332 has been passed or not, is not necessary within the context of a system using a counter value in field 333, but it is none the less possible to also implement field 334 in addition to field 333.

Figure 4:
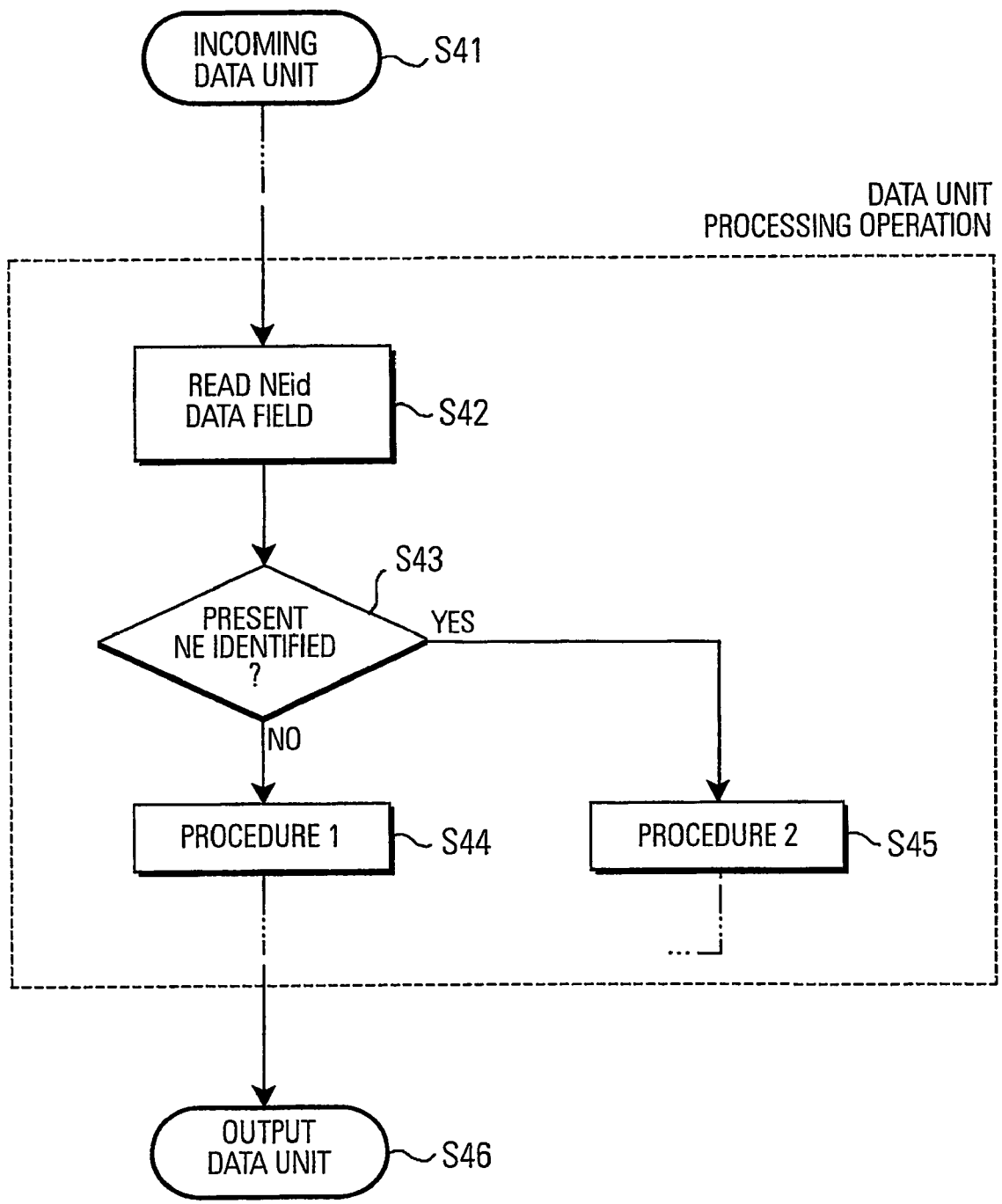
FIG. 4 is a basic flow chart describing one method embodiment of the present invention.

A generalized example of the above described inventive concept is shown in FIG. 4. FIG. 4 shows a flow chart of a general control method employed in a forwarding network entity or in a receiving network entity. After a data unit has arrived in step S41, a data unit processing operation is commenced. A data unit processing operation is indicated by the dash-line box. In a first step S42, the network entity identification (NEid) data field 332 is read. Then, in step S43 it is determined whether the network entity presently handling the data unit is identified in the NEid data field. This can be accomplished in accordance with one of the above mentioned identification concepts. Then, if the presently acting network entity is not identified, a first procedure is conducted in step S44, and if the acting entity is identified, a second procedure S45 is enabled. No details of the procedure in S44 or S45 is shown, as this will depend on the specific requirements and desires. If the network entity performing the method shown in FIG. 4 is a forwarding network entity, then the data unit processing operation finally passes to a step S46 of outputting a data unit.

Figure 5:
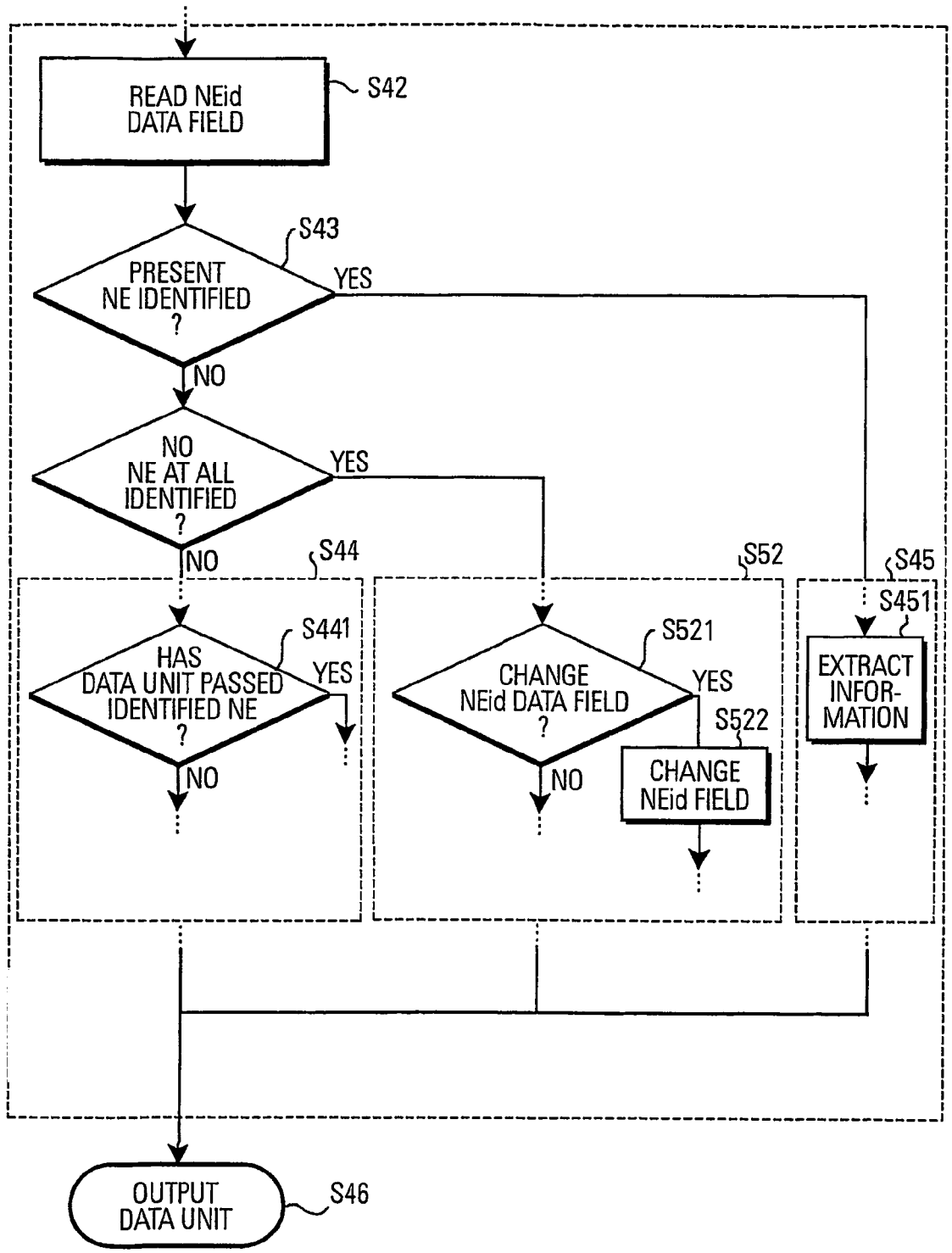
FIG. 5 is a flow chart showing an example of a procedure shown in FIG. 4.

One or more of the above described additional, preferred concepts can be implemented in the data unit processing operation. This is shown in the example of FIG. 5. Steps S42 and S43 are as described in connection with FIG. 4, such that a repeated description is not necessary. The use of a mechanism for determining whether no network entity at all is identified in the NEid data field 332 can e.g. be employed in a decision step S51 that follows decision step S43 if the outcome of S43 indicates that a network entity presently handling the data unit is not identified. If the outcome of step S51 indicates that indeed a network entity is identified (outcome "no" in FIG. 5) then procedure 1 is entered, as indicated by S44. Furthermore, in the example of FIG. 5, procedure S44 has the additional determination step of deciding whether the data unit has passed the identified network entity or not, see S441. Subsequent thereto, appropriate steps can be taken as is desired or required within the given context, which is not shown, as it is of no further importance for the present invention.

If the outcome of step S51 indicates that no network entity at all is identified (e.g. because a predetermined default value is contained in the NEid field 332) then a procedure S52 is enabled. This procedure S52 can e.g. contain a decision step S521 to determine whether the NEid data field 332 is to be changed or not. If it is decided to not change the field, then the procedure continues without changing the field, and otherwise a step S522 is enabled, for changing the field in accordance with a desired mechanism. For example, if the NEid data field is defined to indicate the bottleneck of the communication between the sending network entity and the receiving network entity, then step S521 may make the decision to change or leave the NEid data field 332 depending on whether another procedure (not shown in FIG. 5) has determined that the presently acting network entity is the bottleneck, such that its NEid value should be set in the NEid data field 332.

Finally, in the example of FIG. 5, if the outcome of step S43 indicates that the presently acting network entity is indeed identified in the NEid data field 332, then procedure S45 is enabled (like in the example of FIG. 4), where in the example of FIG. 5 it is additionally indicated that procedure S45 comprises a step S451 of extracting information from the received data unit, said information being directed towards the network entity identified in the NEid data field 332 and having been placed in the data unit by one of the preceding (upstream) network entities.

There may be an arbitrary number of further steps prior to S441, S521 and S451, and equally an arbitrary number of subsequent steps within the data unit processing operation, which are not shown in the figure, as they will depend on the specific desires and requirements involved in the communication system to which the invention is applied, and are of no importance for the present invention. The data unit processing operation finally passes to step S46 for outputting the data unit, if the network entity processing the data unit is a forwarding data unit.

Figure 7:
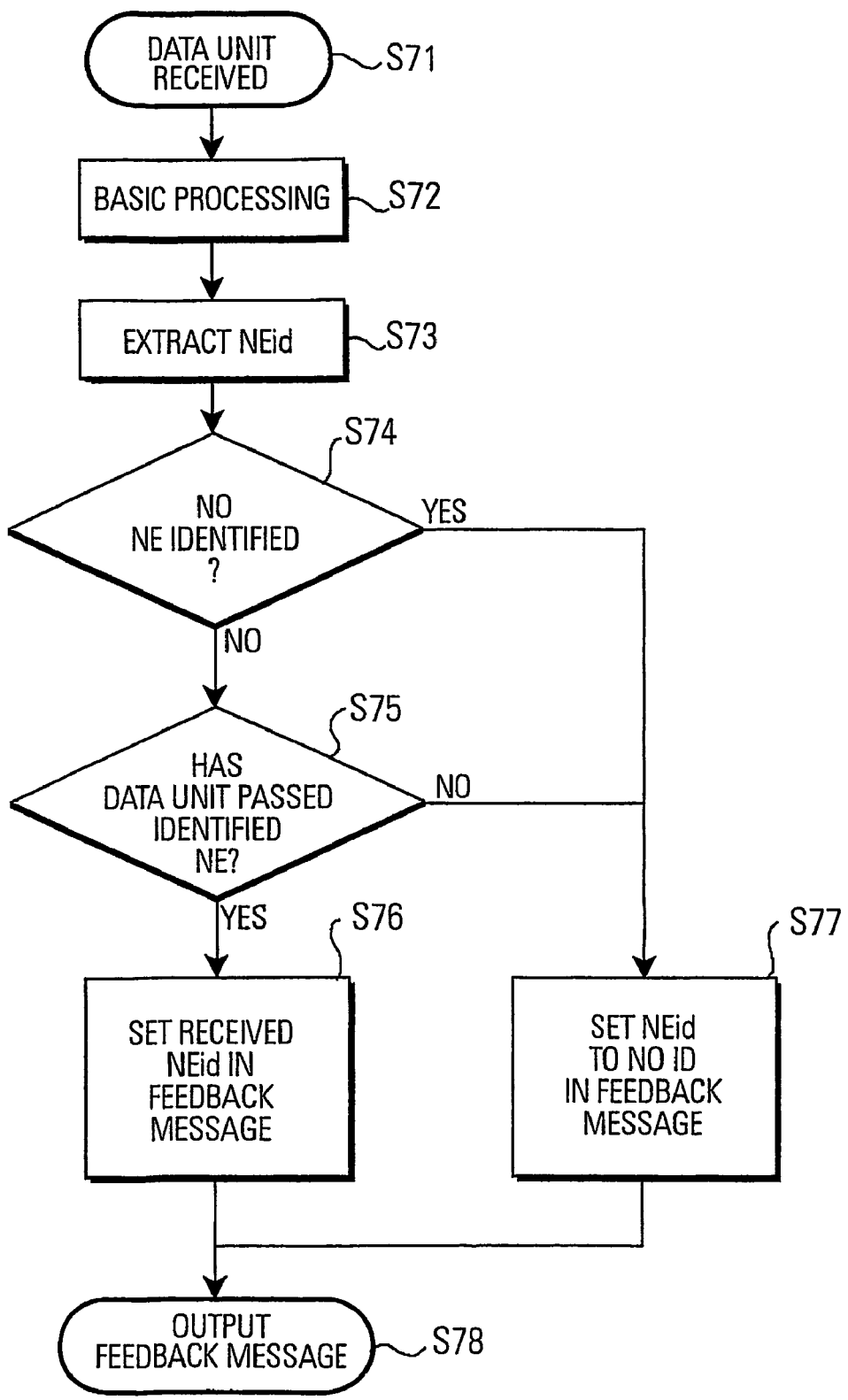
FIG. 7 is a flow chart of a method embodiment as implemented in a receiving network entity.

FIG. 7 shows a flow chart of a control method that can be implemented in a receiving network entity operating in accordance with the present invention. It is assumed that data units are arranged in such a way that the NEid data field not only allows deciding whether a network entity processing the data unit is identified or not, but also allows a decision whether no network entity at all is identified in the NEid data field. Furthermore, it is assumed that a feedback mechanism is implemented, according to which the receiving network entity sends feedback messages to the sending network entity after having received data units, where a feedback message contains information related to the receipt of a corresponding data unit. An example of such a mechanism is ARQ (Automatic Repeat reQuest).

As can be seen in FIG. 7, after having received a data unit in step S71, some form of basic processing is performed in procedure S72, where said basic processing will depend on the given protocol and communication environment, and is of no further importance to the present invention, such that no further details are shown. Then in step S72 the network entity identification information NEid is extracted from the corresponding field. In decision step S74 it is decided whether no network entity is identified at all. If indeed no network entity is identified at all, the procedure branches to step S77. In step S77, a feedback message sent in response to receiving the data unit that has been processed is arranged such that an indication is set therein to inform the sending network entity that a receiving network entity has identified no network entity with respect to the NEid field. This can e.g. be accomplished by setting the same default value in a NEid field in the feedback message, e.g. an acknowledgement message.

If the outcome of step S74 indicates that a network entity identification is contained in the corresponding field, then the procedure can immediately go to a step S76, in which the received NEid is set in an appropriate field of the feedback message. Further, as shown in FIG. 7, it is also possible to add a further decision step, in which it is determined whether the received data unit has passed the network entity identified in the network entity identification field. If it is determined that the data unit has not passed the network entity identified in the NEid data field, then the procedure branches to step S77 again, in which the appropriate field of the feedback message is set to indicate no identification of a network entity. Namely, if step S75 determines that the identified network entity has not been passed, then this means that the path or route of the sequence of data units sent from the sending network entity to the receiving network entity has changed with respect to paths followed by previous data units sent from the sending network entity to the receiving network entity. It may be noted that subsequent to such a determination in step S75, there can also be the additional step of adding an explicit indication of this fact to the feedback message.

On the other hand, if the outcome of step S75 indicates that the data unit has passed the network entity identified in the NEid data field, then previously described step S76 is performed. Further, subsequent to adding appropriately set NEid information in the feedback message, the feedback message is outputted in step S78.

Preferably, the sending network entity is arranged in such a way that is sets the initial value in the network entity identification data field to a value derived from one or more of the feedback messages generated in accordance with the procedure of FIG. 7.

Figure 6:
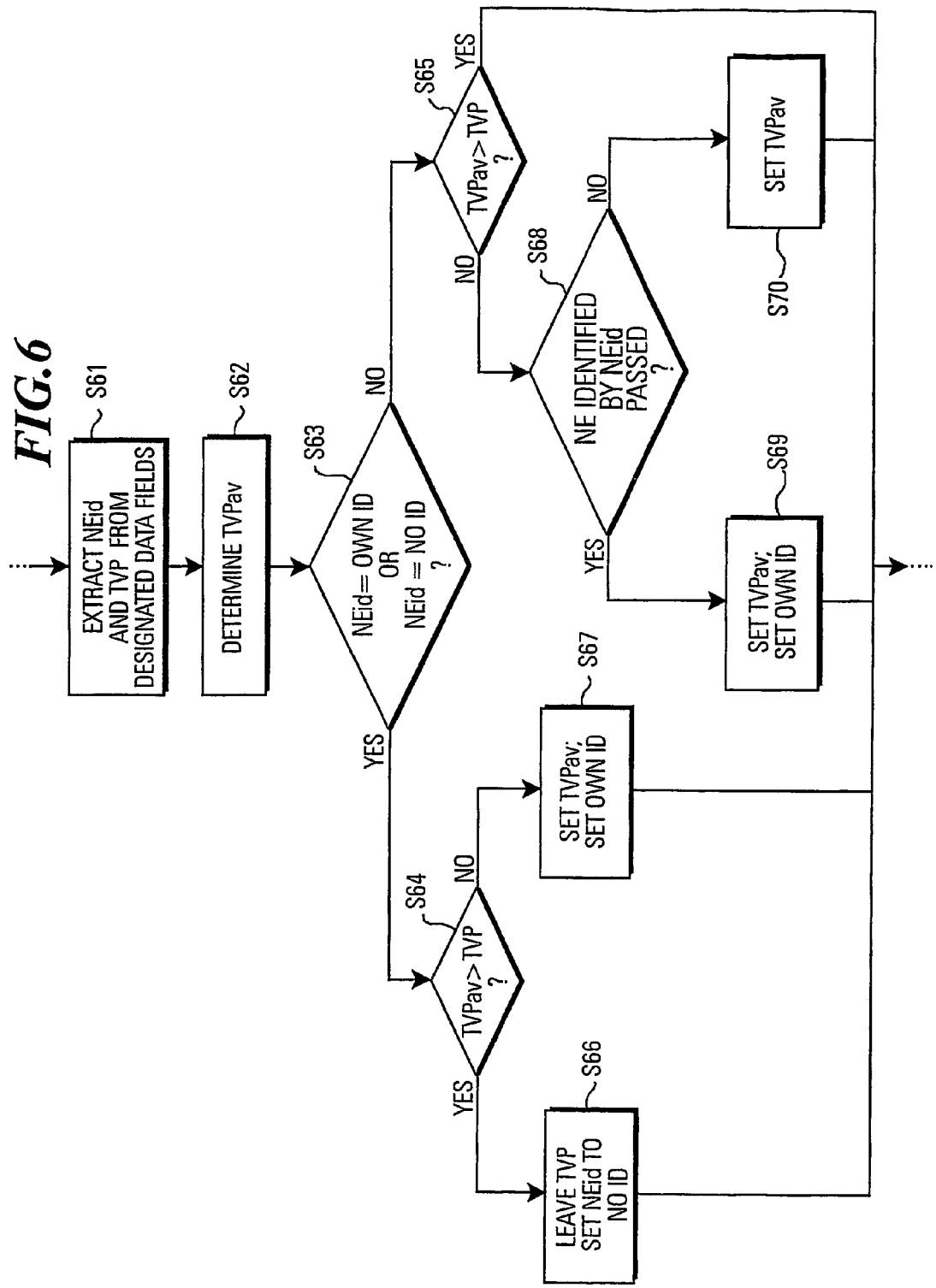
FIG. 6 is a flow chart of a preferred method embodiment of the present invention as applied in a forwarding network entity.

Now a preferred embodiment of the invention will be described with reference to FIG. 6. FIG. 6 shows a flow chart of a specific data unit processing operation conducted in a forwarding network entity. In accordance with the embodiment of FIG. 6, the transmitted data unit 21 (see FIG. 3) contains a predetermined data field that contains a desired transmission volume parameter (TVP). The desired transmission volume parameter can e.g. be a data amount value (such as a window size in a window-based flow control scheme), a data rate value (in a rate based control scheme), or any suitable combination of a data rate value and data amount value.

The TVP data field, which is shown as 335 in FIG. 3, is set to a desired value in the sending network entity. In other words, the sending network entity places information into the sent data units, which information indicates how much transmission value (e.g. in terms of data amount or data rate) the sending network entity desires.

The data unit processing operation performed in the one or more forwarding network entities between the sending network entity and the receiving network entity, of which the method shown in FIG. 6 is an example, comprises a procedure for determining a transmission volume parameter available at the forwarding network entity performing the data unit processing procedure, where said available transmission volume parameter will be referred to as TVPav. The data unit processing operation furthermore comprises comparing the available transmission volume parameter TVPav with the value contained in the TVP data field (which may be the initial desired value set by the sending entity, or a value subsequently modified by one of the forwarding network entities preceding the present network entity). Furthermore, the data unit processing operation comprises deciding whether to set the available transmission volume parameter TVPav in said TVP data field, depending on the outcome of whether the present network entity is identified in the NEid data field and the outcome of the step of comparing TVPav with TVP derived from the TVP field.

Preferably, the data unit processing operation comprises setting the value TVPav in the TVP data field if TVPav is smaller than the value contained in the TVP field of the received data unit, and otherwise leaving the TVP field unchanged. In other words, if it is determined that the transmission volume parameter available at the present network entity is smaller than the value desired by the sending network entity or the value reduced by a preceding forwarding network entity, then this information should be provided to subsequent network entities. Therefore, the TVP data field is appropriately set to this (up to now) lowest available TVP.

Preferably, the possible modification of the NEid data field is done in the following way:

If the outcome of the step for deciding whether the present network entity is identified in the NEid data field indicates that the NEid data field identifies the present network entity or identifies no network entity at all, then the NEid data field is set to identify no network entity at all in the forwarded data unit, if the available transmission volume parameter TVPav is larger than the value contained in the TVP data field, and the NEid data field is set to identify the present network entity if the available transmission volume parameter TVPav is smaller than the value contained in the TVP data field.

On the other hand, if the outcome of the identification decision indicates that the NEid data-field identifies a different network entity than the present one, and if the available transmission volume parameter TVPav is smaller than the value contained in the TVP data field, a procedure is performed for determining whether the data unit has passed the network entity identified in the NEid field or not. If it is determined that the data unit has passed the network entity identified in the NEid data field, the NEid data field of the data unit to be forwarded is set to identify the present network entity, and if it is determined that the data unit has not passed the network entity identified in the NEid data field, the NEid data field is left unchanged.

An example of the above-described concepts is shown in FIG. 6. After having received a data unit, the values of the NEid data field and the TVP data field are extracted. Then, in step S62, the available transmission volume parameter TVPav is determined (examples thereof will be given further on). Subsequent to step S62, a decision is made in step S63, whether the NEid extracted from the received data unit identifies the present network entity (own id) or it identifies no network entity at all. If the outcome of step S43 indicates that NEid identifies the present network entity or no network entity at all, the procedure passes to step S64. Step S64 decides whether the transmission volume parameter available at the present network entity exceeds the transmission volume parameter given in the received data unit. In other words, it is checked whether the present network entity provides the lowest transmission volume parameter for the data unit among the network entities encountered so far by the data unit. If the outcome of step S64 is that the available transmission volume parameter is larger than the one indicated in the received data unit, which means that either the desired TVP or the TVP available at a preceding network entity is smaller, the value of TVP in the TVP data field is left unchanged, and the value of NEid in the NEid data field is in any case set to identify no network entity at all.

On the other hand, if the outcome of step S64 indicates that the transmission volume parameter available at the present network entity is indeed the smallest so far (outcome "no"), then the procedure branches to step S67, where the available transmission volume parameter TVPav is set in the TVP data field of the data unit being forwarded and the value of NEid identifying the present network entity is set in the NEid data field. In other words, the present network entity still has the smallest transmission volume parameter (if step S63 identified the NEid of the present network entity) or has become the network entity with the lowest available transmission volume parameter (if step S63 indicated that NEid in the received data unit identified no data unit at all).

On the other hand, if the outcome of step S63 indicates that a different network entity than the present network entity is identified in the NEid data field (outcome "no"), the procedure branches to step S65. Step S65 is identical to step S64 in that it determines whether the transmission volume parameter available at the present network entity is larger than the transmission volume parameter indicated in the TVP data field of the received data unit. If the outcome of step S65 is such that the available transmission volume parameter is larger than the one indicated in the data unit, the NEid data field and the TVP data field are left unchanged in the forwarded data unit. Further, if the outcome of step S65 indicates that TVPav is smaller than TVP (outcome "no"), the procedure branches to step S68.

Step S68 is a step for determining whether the network entity identified by the NEid in the NEid data field of the received data unit has been passed or not. If the outcome of step S68 indicates that the identified network has been passed, the procedure goes to step S69, in which the available transmission volume parameter TVPav is set in the TVP data field of the data unit to be forwarded, and the identification of the present network entity is set in the NEid data field of said data unit to be forwarded. The id of the present network entity is set, because the branch leading to step S69 indicates that the network entity identified in the NEid data field is located upstream of the present network identity such that the present network entity is the new bottleneck of the connection, which is appropriately to be registered in the data unit being forwarded.

On the other hand, if the outcome of step S68 indicates that the network entity identified in the NEid data field of the received data unit has not been passed, i.e. the bottleneck identified by the field is located downstream, then the procedure passes to step S70 in which the transmission volume parameter available at the present network entity is set into the TVP data field in the data unit being forwarded, but the NEid field is not changed. If the present forwarding network entity is still the bottleneck for a subsequent data unit sent from the sending network entity to the receiving network entity (i.e. for a subsequent data unit of the flow after one RTT, such that the receiving network entity could feed back the value in the NEid field to the sending network entity, and the sending network places this identifier in said subsequent data unit), then it will get its identifier written into the NEid field (in step S67).

The method described in connection with FIG. 6, which is implemented in a forwarding network entity, is preferably, combined with the method for a receiving network entity described in connection with FIG. 7, with the following addition. The value contained in the TVP data field of the data unit received at the receiving network entity is in any case copied into the feedback message sent to the sending network entity. Thereby, the sending network entity is informed of the available transmission volume parameter, and can accordingly adjust its control procedure for outputting further data units to the same receiving network entity on the basis of this information. Furthermore the receiving network entity will inform the sending network entity either of the network entity having the lowest available transmission volume parameter (the bottleneck), see step S76 in FIG. 7, or will inform the sending network entity that no network entity with a lowest transmission volume parameter is known for the received data unit (i.e. no bottleneck network entity is known). The sending network entity can then appropriately add this NEid information received from the receiving network entity into further data units sent to the same receiving network entity.

In the above-described example of FIG. 6, a situation was considered in which no separate field 334 (see FIG. 3) is provided, i.e. a field that identifies whether the network entity identified in the NEid data field has been passed or not by the data unit carrying said fields. For example, this can be the case if the above-described concept of using a counter and a counter compare value are used for identification purposes. However, if the additional field for indicating whether the network entity identified by the NEid field has been passed or not is used, it is preferable to amend the procedure shown in FIG. 6 by setting this additional field to the indication of "network identity has been passed" in steps S66 and S67, but to leave this field unchanged in steps S69 and S70. It may be noted that when using this additional field, step S68 can be implemented by simply checking the setting of this field. Namely, if the outcome of step S68 is "yes", then the additional field is already set to indicate that the network entity identified in the NEid data field has been passed, and if the outcome of step S68 is "no", then the field indicates that the network entity identified in the NEid data field has not been passed, which should be kept that way at the outcome of step S70. If the present forwarding network entity is still the bottleneck for a subsequent data unit sent from the sending network entity to the receiving network entity (i.e. for a subsequent data unit of the flow after one RTT), then it will get its identifier written into the NEid field (in step S67).

Regarding the step S62 of FIG. 6, in which the available transmission volume parameter TVPav is determined, this value can be determined in any suitable or desirable way. For example, it can be accomplished by determining the difference between the output data rate or capacity available at the output link of the present forwarding network entity and the rate of incoming data units. In other words, this corresponds to the overall bandwidth difference between outgoing data units and incoming data units. This value can suitably be processed to obtain an overall available transmission volume parameter, i.e. the transmission volume parameter available to the sum of all incoming data units. If the transmission volume parameter is a rate, when the difference between the output rate and input rate can simply be directly taken as the overall available transmission volume parameter, or possibly multiplied by a dimensionless coefficient. If the transmission volume parameter is a data amount, then the difference between the output rate and the input rate must be appropriately processed by a coefficient to produce a data amount value.

In the simplest case, this overall available transmission volume parameter can then simply be divided onto all incoming data units by simply dividing the overall available transmission volume parameter by the number of presently incoming data units. However, in accordance with the present invention, it is preferred to calculate the available transmission volume parameter for individual data units by distinguishing such incoming data units that identify the present network entity in their NEid data field or identify no network entity at all in their NEid data field from those which identify a different network identity in said field. In other words, it is preferable to divide the available transmission volume parameter onto incoming data units taking into account whether these incoming data units identify the present network entity as their bottleneck or not. Then the available transmission volume parameter for a given data unit is calculated in dependence on the overall available transmission volume parameter, one or more data unit related parameters (such as the size of the data unit, the roundtrip time identified in the data unit, etc.) and a normalisation sum, where the normalisation sum runs over a predetermined set of data units being forwarded (i.e. incoming data units), said predetermined set comprising only those data units that either identify the present forwarding network entity or identify none at all in their NEid data field. In this way, the normalisation sum only takes into account contributions from incoming data units (more specifically: from data units arrived within a predetermined control interval) that do not identify in their NEid data field a bottleneck in another network entity. As a consequence, the available overall transmission volume parameter is not falsely divided with respect to such data units that have their bottleneck elsewhere. Only those data units are taken into account for which the present network entity is indeed the bottleneck.

Now a specific application of the concept described in connection with FIG. 6 to a specific problem will be explained. This explanation will make reference to a communication protocol referred to as XCP (eXplicit Control Protocol), which is a preferred application. However, it may already be noted that the concept of FIG. 6 can also be applied to other protocols having similar properties as XCP. XCP has been proposed as an alternative transport protocol to TCP (Transport Control Protocol), see e.g. the paper "Congestion Control for High Bandwidth-Delay Product Networks" by Dina Katabi, Mark Handley and Charlie Rohrs, SIGCOMM' 02, Aug. 19-23, 2002. XCP is considered to be very useful in mobile environments with time varying end-to-end path properties owing to user mobility, radio channel fluctuation and radio capacity limitation. In these cases XCP can achieve faster conversions towards a change in link properties compared to TCP, achieve a better link utilisation, which is in particular important for expensive radio spectrum, and work with largely reduced number of packet losses, which is beneficial for any application sending data.

In accordance with XCP, a window-based flow control is used in the data unit sender. The header of a XCP data unit comprises a field in which the momentary congestion window of the sender is written, said field being called H_cwnd. Furthermore, a field is provided in which the sender writes its current RTT estimate, said field being called H_rtt. Finally, XCP also provides for a field H_feedback, which is modified by forwarding network entities between the sender and receiver, in order to influence the congestion windows at the source. In other words, the field H_feedback, which contains a data amount, contains a transmission volume parameter in the above-described sense. Each forwarding network entity operating in accordance with XCP determines the value of H_feedback available to an individual data unit, and if this value is smaller (the field can take negative values) than the value contained in the received data unit, then the new smaller value is written into the forwarded data unit. In this way, the receiving network entity acquires information on the most limiting entity (i.e. the bottleneck) along the connection between the sender and the receiver, and the receiving network entity places this information into a feedback message sent to the sending network entity.

Consequently, the sending network entity can adjust its data unit flow control.

However, there is a fundamental problem with the algorithms used in XCP. The operation of the forwarding XCP network entities is that if the forwarding network entity experiences congestion (the overall incoming traffic grows beyond the outgoing capacity), this network entity is treated as being the bottleneck for all of the flows passing through this specific network entity. However, this assumption is not in general valid. In particular, in mobile environments many flows sharing the same network path can greatly differ in the path capacity, due to the capacity in the last (e.g. wireless) link. As a consequence, the bandwidth allocation algorithms in a forwarding XCP network entity can cause an under-utilisation of links. This can be explained by considering an example in the context of FIG. 1.

Namely, if one considers two flows, one from network entity 13 to network entity 10 via forwarding network entity 25 and 21, and one from network entity 13 to network entity 12, via forwarding network entities 25, 21, 22. If one assumes that the connection between 22 and 12 is a low bandwidth connection, e.g. a mobile link having an available bandwidth of 64 kbps, whereas the connection between 21 and 10 is a high bit rate connection, e.g. a fixed line access link having 2 Mbps, the following situation can occur in XCP. Network entity 25 can become overloaded in the sense that the amount of incoming traffic exceeds the output capacity. The algorithm used by XCP for dividing the available bandwidth over the incoming data units will give the same fair share to all data units. However, it is well possible that although entity 25 is the bottleneck for the connection between 13 and 10, it is not the bottleneck for the connection between 13 and 12. If one e.g. assumes an available bandwidth of 1 Mbps between network entities 25 and 21, this means that each of the two flows receives 0.5 Mbps. However, the flow directed towards network entity 12 can only utilize 0.64 Mbps, such that in total only 0.564 Mbps of the available 1 Mbps will be utilized in the link between network entities 25 and 21. Therefore, there is a link under-utilization problem in XCP.

As indicated further above, the present invention can solve this problem, as each network entity can distinguish whether it is in fact the bottleneck for a given data unit or not. By only taking into account those data units for which it actually is the bottleneck, or for which no bottleneck at all is identified, a forwarding network entity using the previously described concepts can avoid assigning bandwidth (more generally an available transmission volume parameter) to data units that belong to a flow that is limited in another network entity, i.e. has its bottleneck elsewhere.

Within the context of a window-based flow control system as used by XCP, a number of examples for specifically calculating the available transmission volume parameter will be given.

In the context of XCP, the transmission volume parameter is called H_feedback. The available transmission volume parameter will be referred to as feedback_new.

As a first step, the overall or aggregate feedback $\Phi$ given by a forwarding network entity in a control interval d is defined as:

$$\Phi = \alpha \cdot d \cdot S - \beta Q$$

where the control interval d is the average RTT of all flows going through the forwarding network entity, S is the so-called spare bandwidth available at the outgoing link (i.e. link capacity minus input rate of incoming data units), Q is the queue size seen over a certain time interval, and $\alpha$ and $\beta$ are constant parameters.

In order to allow some "bandwidth shuffling" it is possible to add some shuffled bandwidth h in the bandwidth allocation algorithm (which allows some faster convergence in the case of a small $\Phi$):

$$h = \max(0, \gamma \cdot y - |\Phi|)$$

where y is the average input traffic in an average RTT, and $\gamma$ is a constant.

The feedback_new value of a data unit i, referred to as feedback_new$_i$ is calculated as:

$$\text{feedback\_new}_i = p_i - n_i,$$

where pi is the positive feedback of data unit i (in case of $\Phi>0$) and $n_i$ is the negative feedback (in case of $\Phi<0$). If $\Phi<0$, the forwarding network entity could allocate extra bandwidth to its flows, whereas if $\Phi<0$, the forwarding network entity should reduce the current load.

For positive bandwidth allocation ($\Phi>0$) $p_i$ is defined as $$p_i = \xi_p \frac{rtt_i^2 \cdot s_i}{cwnd_i}$$

where rtt$_i$ is the RTT field in the congestion header of data unit i (the congestion header is a subunit of the full header), s$_i$ is the size of the data unit i, cwnd$_i$ is the congestion window field in the congestion header of data unit i, and $\xi_p$ is a parameter which is determined as:

$$\xi_p = \frac{h + \max(\Phi, 0)}{d \cdot \sum_{L'} \frac{rtt_i \cdot s_i}{cwnd_i}}$$

where the sum in the nominator is a normalisation sum running over a set of data units L'. The set of data units L' contains. every data unit arriving within the control interval d for which the identifier NEid in the NEid data field (i.e. the bottleneck identifier) either identifies the present forwarding network entity or no network entity at all.

For negative bandwidth allocation ($\Phi<0$) various allocation strategies can be performed, depending on the fairness strategy that it is desired to deploy. In the following, two examples will be given for such fairness strategies, namely "max-min fairness" and "proportional fairness".

In the case of proportional fairness, the negative feedback per data unit $n_i$ is defined as $$n_i = \xi_n \cdot rtt_i \cdot s_i \qquad (1)$$

where $rtt_i$ is the RTT field in the congestion header of data unit i, $s_i$ is the size of data unit i and $\xi_n$ is a parameter which is determined as $$\xi_n = \frac{h + \max(-\Phi, 0)}{d \cdot \sum_L s_i}$$

and the normalisation sum runs over a set of data units L. The set of data units L contains every data unit arriving within the control interval d, independent of the value contained in the NEid data field.

When using the "max-min" fairness strategy, $n_i$ is defined like in above-equation 3, but the parameter $\xi_n$ is defined as $$\xi_n = \frac{h + \max(-\Phi, 0)}{d \cdot \sum_{L'} s_i}$$

and the normalisation sum runs over the set of data units L'. The set of data units L' contains every data unit arriving within the control interval d for which the network entity identification data field identifies either the present network entity or no network entity at all. In other words, only those data units are taken into account, which do not identify a bottleneck elsewhere.

The forwarding network entity calculates an average rate r for all flows which do not have their bottleneck in some other network entity. This average rate r is obtained by averaging over the sending rate from all the data units of the set L'. The sending rate of a flow is derived from the fields in the congestion header:

$$r_i = cwnd_i/rtt_i.$$

In addition, the number of flows N which do not have a bottleneck in another network entity can be estimated as:

$$N = \sum_{L'} \frac{1}{\frac{cwnd_i}{s_i} \cdot \frac{d}{rtt_i}}$$

and the summing is done over the set of data units L'.

For all data units arriving at the forwarding data unit during a control interval when $\Phi<0$, the following calculation of $n_i$ may be performed, expressed in pseudo-code as:

```
if (r+Φ/(d*N))<(cwnd_i/rtt_i)||(NEid == OwnID){
    set n_i according to equation (1)
}
else {
    set n_i=0
    // This flow is not required to reduce its rate,
    // but it is also not allowed to increase its rate
    // further.
}
```

The above operation reduces the sending rates of data units that either were already limited by the present forwarding network entity or would have a higher than fair share after decreasing the load. Other flows that are not limited by the present network entity and do not exceed their fair share are left without reduction, but are also not allowed to increase the rate (this is ensured by setting $n_i=0$).

Beyond the above described methods, which can be implemented in a sending network entity and/or a forwarding network entity and/or a receiving network entity, the present invention also relates to appropriately arranged network entities themselves. This shall be explained with reference to FIGS. 2a, 2b and 2c.

Figure 2A:
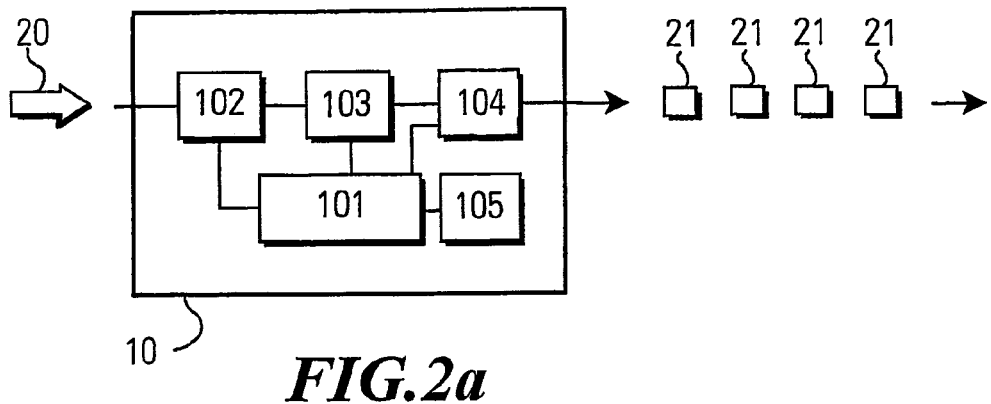
FIG. 2a shows a schematic block diagram of a sending network entity.

FIG. 2a shows a schematic block diagram of a sending network entity 10. As can be seen, the sending network entity 10 comprises a processor 101 arranged to control the operation of the entity. Furthermore a data input buffer 102 for receiving input data 20 as provided, connected to a data processing buffer 103 and an output buffer 104. Data units 21 generated in the data unit processing buffer 103 under control of processor 101 are output from output buffer 104. Furthermore, a memory 105 is shown, which comprises programs, routines and procedures to be executed by processor 101, and may also serve to store values calculated by processor 101. It may be noted that the buffers 102 to 104 and the memory 105 can be provided by a single memory arrangement that is appropriately accessed and manipulated by processor 101. The processor 101 and memory 105 are arranged to execute the above described methods for the sending network entity, where the method may be implemented in the form of software executed by processor 101. Therefore, the present invention can also be embodied as a computer program or a computer program product, and as a data carrier carrying such a computer program or computer program product.

In FIG. 2a the generated data units 21 are output over a suitable or desirable link (not shown in the figure), e.g. a fixed communication line or a wireless communication link.

Figure 2B:
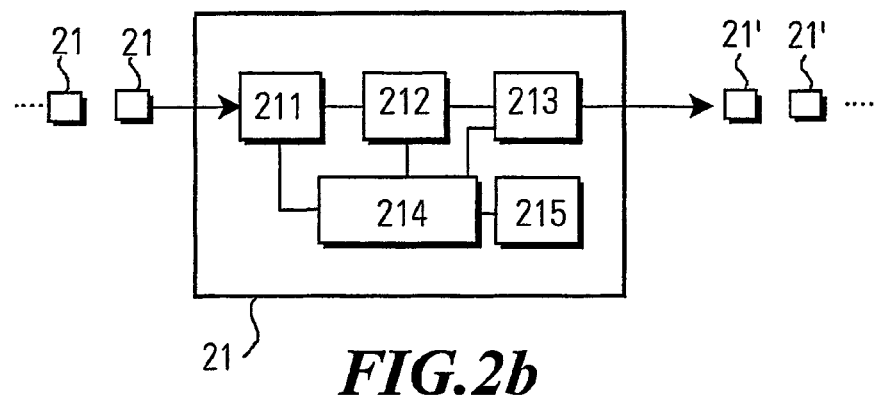
FIG. 2b shows a schematic block diagram of a forwarding network entity

FIG. 2b shows a schematic block diagram of a forwarding network entity. The structure is very similar to that of the sending network entity 10. Namely, the forwarding network entity 21 shown in FIG. 2b has an input buffer 211, a processing buffer 212 and an output buffer 213. The buffers operate under the control of a processor 214, which in turn is connected to a memory 215 for storing programs, routines and procedures to be executed by the processor 214, as well as for storing values calculated by the processor 214. The forwarding network entity 21 receives data units 21 over an appropriate link (not shown) and outputs data units 21', which may be identical to the received data units 21, or may have one or more fields changed by the forwarding network entity 21, in accordance with one of the above described control methods for forwarding network entities. As for the sending network entity 10 shown in FIG. 2a, the control methods can be implemented in the form of software, such that the present invention can also be embodied as a computer program or computer program product in the forwarding network entity, or as a data carrier for such a computer program or computer program product.

Figure 2C:
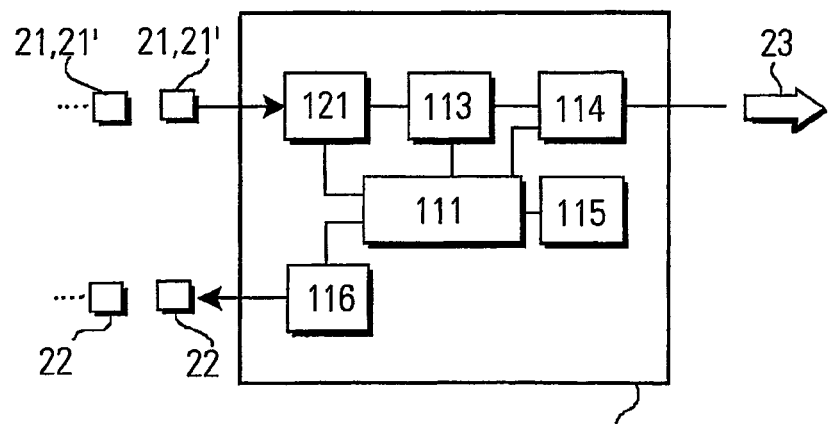
FIG. 2c shows a schematic block diagram of a receiving network entity.

Finally, FIG. 2c shows a schematic block diagram of a receiving network entity. The receiving network entity receives data units 21 or 21' over an appropriate link (not shown) at an input buffer 112. Furthermore, a processing buffer 113 and an output buffer 114 are provided, from which data 23 is output in a suitable or desirable format. The buffers operate under the control of a processor 111, which is connected to a memory 114 that stores programs, routines and procedures be executed by processor 111, and stores values calculated by processor 111. Furthermore, the receiving network entity 11 shown in FIG. 2c comprises a message generator 116 for generating feedback messages 22 to be sent to the sending network entities belonging to individual received data units 21, 21'.

The processor 111 and memory 115 are arranged to execute the above described control methods for the receiving network entity. In this way, the control method can be implemented in the form of software. Therefore, the present invention can also be embodied as a computer program or computer program product in the receiving network entity, and as a data carrier for such a computer program or computer program product.

It may be noted that although FIGS. 2a to 2c show a sending network entity, a forwarding network entity and a receiving network entity, respectively, it is possible to combine all of the above described elements into one device that is capable of being operated as one or more of a sending, forwarding and receiving entity.

Although the present invention has been described on the basis of detailed embodiments, the scope of the invention is defined by the appended claims. Reference numerals in the claims are intended to make the claims easier to understand, but are not limiting.

The invention claimed is:

1. A method of controlling a transmission of data units arranged in accordance with a predetermined communication protocol over a plurality of network entities, said network entities operating according to said predetermined communication protocol, from a sending network entity to a receiving network entity over one or more forwarding network entities, comprising:
   providing in a data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not,
   wherein said network entity identification information conveys information to selected forwarding network entities involved in forwarding data units between the sending network entity and the receiving network entity, thereby enabling the sending network entity to communicate with the selected forwarding network entities;
   in said one or more forwarding network entities:
      performing a data unit processing operation after receiving said data unit, which comprises reading said first data field and making an identification decision on the basis thereof whether the forwarding network entity performing said data unit processing operation is identified or not;
      if the forwarding network entity performing said data unit processing operation is identified in the first data field, performing a further processing operation on the data unit prior to forwarding the data unit toward the receiving network entity; and
      if the forwarding network entity performing said data unit processing operation is not identified in the first data field, forwarding the data unit toward the receiving network entity without performing the further processing operation on the data unit.

2. The method according to claim 1, wherein said first data field is further defined such that a given network entity that reads the network entity identification information can make a decision on the basis thereof whether no network entity at all is identified by said first data field, and said data unit processing operation comprises, at least if the forwarding network entity performing a data unit processing operation is not identified in the first data field, making a decision whether no network entity at all is identified by said first data field.

3. The method according to claim 1, comprising including in said data unit information directed towards a network entity identified in said first data field, and where said further data unit processing operation comprises reading said included information if said identification decision determines that the forwarding network entity performing said data unit processing operation is identified in said first data field.

4. The method according to claim 1, wherein said further data unit processing operation comprises a decision procedure for deciding whether to change the contents of said first data field, and a changing procedure for changing the contents of said first data field in dependence on said decision procedure.

5. The method according to claim 1, wherein a network entity identified in said first data field is associated with the fulfillment of a predetermined condition with respect to other network entities involved in the transmission of data units from the sending network entity to the receiving network entity.

6. The method according to claim 5, wherein said predetermined condition is the providing of the smallest amount of transmission capacity to said transmission between said sending network entity and said receiving entity, among the network entities involved in the transmission of data units from the sending network entity to the receiving network entity.

7. The method according to claim 1, further comprising:
   providing in said data unit a second data field arranged to provide information on whether a network entity identified in said first data field has been passed or not by said data unit, said second data field being independent of said first field.

8. The method according to claim 1, wherein said network entity identification information comprises a unique identifier, each network entity being assigned its own identifier, and said identification decision comprises comparing the unique identifier contained in said first data field with the unique identifier assigned to the forwarding network entity performing said data unit processing operation.

9. The method according to claim 1, wherein said data unit includes a count value, said count value being set to a predetermined initial value in said sending network entity, and after receiving said data unit in said one or more forwarding network entities, said count value being changed by a predetermined count difference value to a changed count value, and said changed count value being set in said data unit before forwarding said data unit, wherein said network entity identification information comprises a count compare value of a same format as said count value, and said identification decision comprises comparing said count compare value with said count value and/or said changed count value.

10. The method according to claim 9, wherein said data unit processing operation comprises a procedure for distinguishing whether said data unit has passed the network entity identified in said first data field by determining whether said count compare value is larger or smaller than said count value.

11. A method of controlling a transmission of data units arranged in accordance with a predetermined communication protocol over a plurality of network entities, said network entities operating according to said predetermined communication protocol, from a sending network entity to a receiving network entity over one or more forwarding network entities, comprising:

providing in a data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not, wherein said network entity identification information conveys information to selected forwarding network entities involved in forwarding data units between the sending network entity and the receiving network entity, thereby enabling the sending network entity to communicate with the selected forwarding network entities, and in said one or more forwarding network entities, performing a data unit processing operation after receiving said data unit, which comprises reading said first data field and making an identification decision on the basis thereof whether the forwarding network entity performing said data unit processing operation is identified or not;

wherein said first data field is further defined such that a given network entity that reads the network entity identification information can make a decision on the basis thereof whether no network entity at all is identified by said first data field, and said data unit processing operation comprises, at least if the forwarding network entity performing a data unit processing operation is not identified in the first data field, making a decision whether no network entity at all is identified by said first data field; and wherein said first data field is defined such that if no network entity at all is identified, said first data field is set to a predetermined first data field default value.

12. A method of controlling a transmission of data units arranged in accordance with a predetermined communication protocol over a plurality of network entities, said network entities operating according to said predetermined communication protocol, from a sending network entity to a receiving network entity over one or more forwarding network entities, comprising:

providing in a data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not, wherein said network entity identification information conveys information to selected forwarding network entities involved in forwarding data units between the sending network entity and the receiving network entity, thereby enabling the sending network entity to communicate with the selected forwarding network entities, and in said one or more forwarding network entities, performing a data unit processing operation after receiving said data unit, which comprises reading said first data field and making an identification decision on the basis thereof whether the forwarding network entity performing said data unit processing operation is identified or not;

providing in said data unit a third data field arranged to contain a desired transmission volume parameter, in said sending network entity, setting a desired transmission volume parameter in said third data field of said data unit, and said data unit processing operation in said one or more forwarding network entities comprising:

performing a procedure for determining a transmission volume parameter available at the forwarding network entity performing said data unit processing procedure, comparing said available transmission volume parameter with the value contained in said third data field, and deciding whether to set said available transmission volume parameter in said third data field in dependence on the outcome of said identification decision and the outcome of said step of comparing said available transmission volume parameter with the value contained in said third data field.

13. The method according to claim 12, wherein said transmission volume parameter is a data amount value or a data rate value.

14. The method according to claim 12, wherein said data unit processing operation in said one or more forwarding network entities comprises:

if said available transmission volume parameter is smaller than the value contained in said third data field, setting said available transmission volume parameter in said third data field before forwarding said data unit, and otherwise leaving said third data field unchanged.

15. The method according to claim 12, wherein said data unit processing operation in said one or more forwarding network entities comprises:

if the outcome of said identification decision indicates that the first data field identifies the forwarding network entity performing said data unit processing operation, or identifies no network entity at all, setting said first data field to identify no network entity at all if said available transmission volume parameter is larger than the value contained in said third data field, and setting said first data field to identify the forwarding network entity performing said data unit processing operation if said available transmission volume parameter is smaller than the value contained in said third data field.

16. The method according to claim 12, wherein said data unit processing operation in said one or more forwarding network entities comprises:

if the outcome of said identification decision indicates that the first data field identifies a network entity different from the network entity performing said data unit processing operation, and if said available transmission volume parameter is smaller than the value contained in said third data field, performing a procedure for determining whether said data unit has passed the network entity identified in said first data field or not, if it is determined that said data unit has passed the network entity identified in said first data field, setting said first data field to identify the forwarding network entity performing said data unit processing operation, and if it is determined that said data unit has not passed the network entity identified in said first data field, leaving said first data field unchanged.

17. The method according to claim 12, wherein said procedure for determining a transmission volume parameter available at the forwarding network entity performing said data unit processing procedure comprises:

determining a difference (S) between the output data rate available to said forwarding network entity performing said data unit processing procedure for forwarding data units and the rate of incoming data units, calculating an overall available transmission volume parameter on the basis of said difference, calculating the available transmission volume parameter for said data unit in dependence on said overall available transmission volume parameter, one or more data unit related parameters, and a normalization sum, where said normalization sum runs over a predetermined set (L') of data units being forwarded by said forwarding network entity performing said data unit processing procedure, said predetermined set (L') comprising only those data units that either identify said forwarding network entity performing said data unit processing procedure in their first data field or identify no network entity at all in their first data field.

18. A method of controlling a transmission of data units arranged in accordance with a predetermined communication protocol over a plurality of network entities, said network entities operating according to said predetermined communication protocol, from a sending network entity to a receiving network entity over one or more forwarding network entities, comprising:

providing in a data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not, wherein said network entity identification information conveys information to selected forwarding network entities involved in forwarding data units between the sending network entity and the receiving network entity, thereby enabling the sending network entity to communicate with the selected forwarding network entities, and in said one or more forwarding network entities, performing a data unit processing operation after receiving said data unit, which comprises reading said first data field and making an identification decision on the basis thereof whether the forwarding network entity performing said data unit processing operation is identified or not;

wherein said first data field is furthermore defined such that a given network entity that reads the network entity identification information can make a decision on the basis thereof whether no network entity at all is identified by said first data field, and said data unit processing operation comprises, at least if the forwarding network entity performing a data unit processing operation is not identified in the first data field, making a decision whether no network entity at all is identified by said first data field, wherein in said one or more forwarding entities, said data unit processing operation comprises a decision procedure for deciding whether to change the contents of said first data field, and a changing procedure for changing the contents of said first data field in dependence on said decision procedure, and in said receiving network entity, sending a feedback message to said sending network entity after having received said data unit, said feedback message containing information related to the receipt of said data unit, and including in said feedback message information that indicates to said sending network entity that no network entity was identified in said first data field of said data unit if said network entity identification information in said first data field identifies no network entity at all, or it is determined that the data unit has not passed the network entity identified by the network entity identification information in said first data field, and otherwise including in said feedback message, information that indicates to said sending network entity the identity of the network entity identified in said first data field.

19. The method according to claim 18, wherein said sending network entity, after having received said feedback message, sets in said first data field of a data unit to be sent to said receiving peer that no network identity is identified if the information in said feedback message indicates to that no network entity was identified in said first data field of said data unit received at the receiving network entity, and otherwise sets the identity of the network entity identified in said feedback message.

20. A sending network entity for transmitting a data unit arranged in accordance with a predetermined communication protocol over a plurality of network entities, said network entities operating according to said predetermined communication protocol, from said sending network entity to a receiving network entity over one or more forwarding network entities, comprising:

a data unit generator for generating said data unit and providing in said data unit a first data field arranged to contain network entity identification information and data unit processing information, said first data field being different from a forwarding data field designated by said communication protocol to contain information to be used by forwarding network entities for forwarding said data unit to the receiving network entity, said first data field being defined such that a given network entity that reads the first data field can make a decision on the basis thereof whether said given network entity is identified or not, and if identified, process the data unit in accordance with the data unit processing information;

wherein said network entity identification information conveys information to selected forwarding network entities involved in forward inc data units between the sending network entity and the receiving network entity, thereby enabling the sending network entity to communicate with the selected forwarding network entities.

21. The network entity according to claim 20, wherein said data unit generator is furthermore arranged in such a way that said first data field is defined such that a given network entity that reads the network entity identification information can make a decision on the basis thereof whether no network entity at all is identified by said first data field.

22. The sending network entity according to claim 20, wherein said data unit generator is further arranged to include in said data unit, information directed towards a network entity identified in said first data field.

23. The sending network entity according to claim 20, wherein said data unit generator is further arranged in such a way that a network entity identified in said first data field is associated with the fulfillment of a predetermined condition with respect to other network entities involved in the transmission of data units from the sending network entity to the receiving network entity, said data unit generator comprising an element for determining which information to set in said first data field.

24. The sending network entity according to claim 20, wherein said data unit generator is further arranged to provide in said data unit a second data field arranged to provide information on whether a network entity identified in said first data field has been passed or not by said data unit, said second data field being independent of said first field.

25. The sending network entity according to claim 20, wherein said data unit generator is further arranged in such a way that said network entity identification information comprises a unique identifier, each network entity being assigned its own identifier.

26. The sending network entity according to claim 20, wherein said data unit generator is further arranged such that said data unit comprises a count value, and to set said count value to a predetermined initial value, where said network entity identification information comprises a count compare value of a same format as said count value.

27. A sending network entity for transmitting a data unit arranged in accordance with a predetermined communication protocol from the sending network entity to a receiving network entity over one or more forwarding network entities, said network entities operating according to said predetermined communication protocol, said sending network entity comprising:

a data unit generator for generating said data unit and providing in said data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not;

wherein said network entity identification information conveys information to selected forwarding network entities involved in forwarding data units between the sending network entity and the receiving network entity, thereby enabling the sending network entity to communicate with the selected forwarding network entities;

wherein said data unit generator is further arranged in such a way that said first data field is defined such that a given network entity that reads the network entity identification information can make a decision on the basis thereof whether no network entity at all is identified by said first data field; and wherein said data unit generator is further arranged in such a way that said first data field is defined such that if no network entity at all is identified, said first data field is set to a predetermined first data field default value.

28. A sending network entity for transmitting a data unit arranged in accordance with a predetermined communication protocol from the sending network entity to a receiving network entity over one or more forwarding network entities, said network entities operating according to said predetermined communication protocol, said sending network entity comprising:

a data unit generator for generating said data unit and providing in said data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not;

wherein said network entity identification information conveys information to selected forwarding network entities involved in forwarding data units between the sending network entity and the receiving network entity, thereby enabling the sending network entity to communicate with the selected forwarding network entities;

wherein said data unit generator is further arranged in such a way that a network entity identified in said first data field is associated with the fulfillment of a predetermined condition with respect to other network entities involved in the transmission of data units from the sending network entity to the receiving network entity, said data unit generator comprising an element for determining which information to set in said first data field; and wherein said element for determining which information to set in said first data field is arranged to extract said information from one or more feedback messages received by said sending network entity from the receiving entity, said one or more feedback messages relating to the transmission of previous data units from said sending network entity to said receiving network entity.

29. The sending network entity according to claim 28, wherein said predetermined condition is the providing of the smallest amount of transmission capacity to said transmission between said sending network entity and said receiving entity, among the network entities involved in the transmission of data units from the sending network entity to the receiving network entity.

30. A sending network entity for transmitting a data unit arranged in accordance with a predetermined communication protocol from the sending network entity to a receiving network entity over one or more forwarding network entities, said network entities operating according to said predetermined communication protocol, said sending network entity comprising:

a data unit generator for generating said data unit and providing in said data unit a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not;

wherein said network entity identification information conveys information to selected forwarding network entities involved in forwarding data units between the sending network entity and the receiving network entity, thereby enabling the sending network entity to communicate with the selected forwarding network entities;

wherein said data unit generator is further arranged to provide in said data unit a third data field arranged to contain a desired transmission volume parameter, and to set a desired transmission volume parameter in said third data field of said data unit.

31. The sending network entity according to claim 30, wherein said transmission volume parameter is a data amount value or a data rate value.

32. A method of controlling a receiving network entity for receiving a data unit arranged in accordance with a predetermined communication protocol, wherein a plurality of network entities operate according to said predetermined communication protocol, said data unit being sent from a sending network entity to said receiving network entity over one or more forwarding network entities, said data unit having a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not, and furthermore being defined such that a given network entity that reads the network entity identification information can make a decision on the basis thereof whether no network entity at all is identified by said first data field, wherein said network entity identification information conveys information to selected forwarding network entities involved in forwarding data units between the sending network entity and the receiving network entity, thereby enabling the sending network entity to communicate with the selected forwarding network entities, said method comprising:

sending a feedback message to said sending network entity after having received said data unit, said feedback message containing information related to the receipt of said data unit, and including in said feedback message information that indicates to said sending network entity that no network entity was identified in said first data field of said data unit if said network entity identification information in said first data field identifies no network entity at all, or it is determined that the data unit has not passed the network entity identified by the network entity identification information in said first data field, and otherwise including in said feedback message information that indicates to said sending network entity the identity of the network entity identified in said first data field.

33. A network entity for receiving a data unit arranged in accordance with a predetermined communication protocol, said data unit being sent from a sending network entity to said receiving network entity over one or more forwarding network entities, said data unit having a first data field arranged to contain network entity identification information, said first data field being different from a forwarding data field designated by said communication protocol to contain information to be used by forwarding network entities for forwarding said data unit to the receiving network entity, said first data field being defined such that a given network entity that reads the first data field can at least make a decision on the basis thereof whether said given network entity is identified or not, and furthermore being defined such that a given network entity that reads the network entity identification information can make a decision on the basis thereof whether no network entity at all is identified by said first data field, wherein said network entity identification information conveys information to selected forwarding network entities involved in forwarding data units between the sending network entity and the receiving network entity, thereby enabling the sending network entity to communicate with the selected forwarding network entities, said receiving network entity comprising:

a data unit receiver for receiving said data unit, a message generator for generating a feedback message to be sent to said sending network entity, said feedback message containing information related to the receipt of said data unit, said message generator comprising an element for including in said feedback message information that indicates to said sending network entity that no network entity was identified in said first data field of said data unit if said network entity identification information in said first data field identifies no network entity at all, or it is determined that the data unit has not passed the network entity identified by the network entity identification information in said first data field, and otherwise including in said feedback message information that indicates to said sending network entity the identity of the network entity identified in said first data field, and a message output for outputting said feedback message.

* * * * *

UNITED STATES PATENT AND TRADEMARK OFFICE
CERTIFICATE OF CORRECTION

PATENT NO.        : 7,490,163 B2                                           Page 1 of 1
APPLICATION NO. : 10/550112
DATED             : February 10, 2009
INVENTOR(S)       : Ekstrom et al.

It is certified that error appears in the above-identified patent and that said Letters Patent is hereby corrected as shown below:

In Column 21, Line 22, in Claim 16, delete "selling" and insert -- setting --, therefor.

In Column 23, Line 10, in Claim 20, delete "forward inc" and insert -- forwarding --, therefor.

Signed and Sealed this

Twentieth Day of October, 2009

David J. Kappos
*Director of the United States Patent and Trademark Office*